US011866988B2

(12) United States Patent
Flannery et al.

(10) Patent No.: US 11,866,988 B2
(45) Date of Patent: Jan. 9, 2024

(54) HANDS FREE GATE

(71) Applicant: Carlson Pet Products, Inc., Longboat Key, FL (US)

(72) Inventors: Mark A. Flannery, Longboat Key, FL (US); Brian G. Linehan, Saint Paul, MN (US); Elizabeth R. Volk, Saint Paul, MN (US)

(73) Assignee: Carlson Pet Products, Inc., Longboat Key, FL (US)

( * ) Notice: Subject to any disclaimer, the term of this patent is extended or adjusted under 35 U.S.C. 154(b) by 201 days.

(21) Appl. No.: 17/151,201

(22) Filed: Jan. 17, 2021

(65) Prior Publication Data

US 2021/0140235 A1 May 13, 2021

Related U.S. Application Data

(63) Continuation of application No. 15/818,636, filed on Nov. 20, 2017, now Pat. No. 10,895,108, which is a continuation of application No. 15/204,886, filed on Jul. 7, 2016, now Pat. No. 9,822,585, which is a continuation of application No. 14/645,238, filed on Mar. 11, 2015, now Pat. No. 9,388,603.

(Continued)

(51) Int. Cl.

| | |
|---|---|
| ***E05B 53/00*** | (2006.01) |
| ***E05B 65/00*** | (2006.01) |
| ***E06B 11/02*** | (2006.01) |
| ***E05B 1/00*** | (2006.01) |
| ***E06B 9/02*** | (2006.01) |
| ***E05C 1/10*** | (2006.01) |
| *E06B 9/00* | (2006.01) |

(52) U.S. Cl.

CPC .......... *E06B 11/022* (2013.01); *E05B 1/0053* (2013.01); *E05B 53/001* (2013.01); *E05B 65/0007* (2013.01); *E05C 1/10* (2013.01); *E06B 9/02* (2013.01); *E06B 2009/002* (2013.01); *Y10S 292/29* (2013.01); *Y10T 292/0877* (2015.04); *Y10T 292/0969* (2015.04); *Y10T 292/0995* (2015.04)

(58) Field of Classification Search

None

See application file for complete search history.

(56) References Cited

U.S. PATENT DOCUMENTS

| | | | |
|---|---|---|---|
| 271,001 | A | 1/1883 | Thompson |
| 1,618,447 | A | 2/1927 | Kusterle |

(Continued)

OTHER PUBLICATIONS

Richell USA, Award-Winning Hands-Free Pet Gate, web page advertisement at www.richellusa.com/catalog/hands- free-gate. html, Mar. 11, 2015.

(Continued)

*Primary Examiner* — Carlos Lugo

(57) ABSTRACT

The present gate includes a barrier frame and a gate in the barrier frame. The gate is opened by inserting a foot into a foot opening in the gate, which action compresses springs disposed about pivot pins between the gate and the barrier frame and draws an extended latch downwardly and out of a latch receiver that is bottomless, which action unlatches and frees the gate from the barrier frame such that the gate can be swung open. Downward travel of the gate is minimized until a foot pushes a pivoting stop out of the way.

3 Claims, 6 Drawing Sheets

Related U.S. Application Data

(60) Provisional application No. 62/065,555, filed on Oct. 17, 2014, provisional application No. 61/952,603, filed on Mar. 13, 2014.

(56) References Cited

U.S. PATENT DOCUMENTS

| | | | | |
|---|---|---|---|---|
| 2,118,722 | A | 5/1938 | Bock | |
| 2,538,398 | A | 1/1951 | Thompson | |
| 2,759,752 | A | 8/1956 | Demings | |
| 2,851,746 | A | 9/1958 | McPhaden | |
| 3,030,717 | A * | 4/1962 | Lewis | E05D 15/502 49/245 |
| 3,347,581 | A | 10/1967 | Hann | |
| 4,019,281 | A | 4/1977 | Weiler | |
| 5,217,265 | A | 6/1993 | Lerner et al. | |
| 5,657,809 | A | 8/1997 | Longoria | |
| 6,016,629 | A | 1/2000 | Sylvester | |
| 6,176,042 | B1 | 1/2001 | Rossman et al. | |
| 6,183,024 | B1 | 2/2001 | Schultz | |
| 6,425,609 | B2 | 7/2002 | Cheng | |
| 6,499,254 | B2 | 12/2002 | Rossman et al. | |
| 6,715,182 | B2 | 4/2004 | Cheng | |
| 7,373,755 | B2 | 5/2008 | Jefferys | |
| 7,520,542 | B1 | 4/2009 | Price | |
| 7,540,046 | B1 | 6/2009 | Lai | |
| 7,878,558 | B1 | 2/2011 | Bell | |
| 7,963,575 | B2 | 6/2011 | Mayo | |
| 8,205,388 | B2 | 6/2012 | Yates | |
| 8,615,928 | B2 | 12/2013 | Wang | |
| 8,745,922 | B1 | 6/2014 | Matsuda | |
| 8,863,811 | B2 | 10/2014 | Yates | |
| 8,939,474 | B2 | 1/2015 | Hagemeyer | |
| 9,115,530 | B2 | 8/2015 | Michael | |
| 9,279,284 | B1 | 3/2016 | Axelrod | |
| 9,388,603 | B2 | 7/2016 | Flannery | |
| 9,822,585 | B2 | 11/2017 | Flannery | |
| 10,895,108 | B2 * | 1/2021 | Flannery | E05C 1/10 |
| 2001/0000556 | A1 | 5/2001 | Rossman et al. | |
| 2003/0001403 | A1 | 1/2003 | Mizuta | |
| 2003/0009945 | A1 | 1/2003 | Cheng | |
| 2004/0045222 | A1 * | 3/2004 | Hicks | E06B 9/04 49/157 |
| 2004/0251694 | A1 | 12/2004 | Gorski | |
| 2007/0022666 | A1 * | 2/2007 | Andersen | E06B 9/04 49/394 |
| 2010/0293861 | A1 | 11/2010 | Ting et al. | |
| 2011/0175046 | A1 | 7/2011 | Flannery et al. | |
| 2011/0225890 | A1 | 9/2011 | Greenwood | |
| 2015/0027060 | A1 | 1/2015 | Sousa | |
| 2015/0084347 | A1 | 3/2015 | Olsson | |

OTHER PUBLICATIONS

First Years, Hands-Free Gate, web page advertisement at www.target.com/p/the-first-years-hands-free-gate/-/A-525210, Mar. 11, 2015.
Summer Infant, Step to Open Gate, web page advertisement at www.summerinfant.com/steptoopengate, Mar. 11, 2015.
WIPO, Notification Concerning Transmittal Of International Preliminary Report On Patentability dated Sep. 22, 2016 (one page) in PCT/US2015/020233, Geneva, Switzerland.
WIPO, International Preliminary Report On Patentability of Sep. 22, 2016 (nine pages) in PCT/US2015/020233, Geneva, Switzerland.

* cited by examiner

HANDS FREE GATE

This application is a continuation, and claims the benefit under 35 U.S.C. § 120, of U.S. Nonprovisional patent application Ser. No. 15/818,636 filed Nov. 20, 2017 (now U.S. Pat. No. 10,895,108 issued Jan. 19, 2021), which was a continuation, and claims the benefit under 35 U.S.C. § 120, of U.S. Nonprovisional patent application Ser. No. 15/204,886 filed Jul. 7, 2016 (now U.S. Pat. No. 9,822,585 issued Nov. 21, 2017), which was a continuation of U.S. Nonprovisional patent application Ser. No. 14/645,238 filed Mar. 11, 2015 (now U.S. Pat. No. 9,388,603 issued Jul. 12, 2016), which claims the benefit under 35 U.S.C. 119(e) of U.S. Provisional Patent Application No. 61/952,603 filed Mar. 13, 2014 and U.S. Provisional Patent Application No. 62/065,555 filed Oct. 17, 2014, all of which applications are hereby incorporated by reference in their entireties into this application.

FIELD OF THE INVENTION

The present invention relates to a barrier having a gate, more particularly relates to a barrier having a hands free gate therein that may be operated without using the hands, and more specifically relates to a barrier having a hands free gate therein that may be operated by a foot and without a pivoting pedal.

BACKGROUND OF THE INVENTION

A bicyclist pumps his or her pedals, one with the right foot and one with the left foot. A pianist may press down on one of perhaps three pedals, one of which may be a damper pedal. The driver of a car presses down on a brake pedal to stop and an accelerator pedal to go.

Such pedals are different. The common bicycle pedal has two sides, each of which swings up and down about a common pivot point, and the common pivot point in turn rotates planet like around a second pivot point. A piano pedal has two ends, one of which is pushed down by a foot, an action that pivots the other end of the pedal up to push a rod up to raise, for example, dampers off piano strings to keep the strings vibrating. The common brake pedal has no pivot locations immediately at the pedal itself; the pedal or relatively wide piece that confronts the foot is fixed rigidly to a shaft or rod that pivots at a distance from the pedal. The common accelerator pedal may have a pivot point at least at one end of the pedal.

A pedal may be a lever. A lever may be defined as a machine that includes a beam or rigid rod that is pivotable at a fixed hinge or fulcrum. A lever may be defined as a beam connected to a structure or its environment by a hinge, pivot or fulcrum.

A pedal is typically an active or moving part of a mechanism. That is, activation or a pressing upon the pedal transmits a force to another part of the mechanism.

SUMMARY OF THE INVENTION

A feature of the present invention is the provision in a gated barrier having a barrier frame and a gate engaged to the barrier frame, of the gate being movable vertically in or out the barrier plane, and of the gate being swingable relative to the barrier frame such that the gate is swingable in or out of the barrier plane.

Another feature of the present invention is the provision in a gated barrier having a barrier frame and a gate engaged to the barrier frame, of the gate movable vertically in the barrier plane, and of a latch between the barrier frame and gate and engaged to one of the barrier frame and gate, where the latch includes a latch end, where the latch has an extended position relative to the gate, where the latch has a retracted position relative to the gate.

Another feature of the present invention is the provision in a gated barrier having a barrier frame and a gate engaged to the barrier frame, of a latch receiver on one of the barrier frame and gate, where the latch end is receivable in the latch receiver when the latch is in the extended position.

Another feature of the present invention is the provision in a gated barrier having a barrier frame and a gate engaged to the barrier frame, of the gate being swingable out of the barrier frame when the latch is in the extended position, and of the gate being swingable out of the barrier frame when the latch is in the retracted position.

Another feature of the present invention is the provision in a gated barrier having a barrier frame and a gate engaged to the barrier frame, of the gate being swingable into and out of the barrier frame when the latch is in the extended position, and of the gate being swingable into and out of the barrier frame when the latch is in the retracted position.

Another feature of the present invention is the provision in a gated barrier having a barrier frame and a gate engaged to the barrier frame, of the latch being slideable to and away from the latch receiver to slide the latch into and out of the extended and retracted positions.

Another feature of the present invention is the provision in a gated barrier having a barrier frame and a gate engaged to the barrier frame, of the latch being engaged to the gate, where the latch receiver is bottomless, and where the latch end is drawn downwardly out of the latch receiver when the gate is drawn downwardly relative to the barrier frame.

Another feature of the present invention is the provision in a gated barrier having a barrier frame and a gate engaged to the barrier frame, of the gated barrier being free of a pedal that pivots relative to the gate.

Another feature of the present invention is the provision in a gated barrier having a barrier frame and a gate engaged to the barrier frame, of the gated barrier being free of a pivoting pedal that transmits a force that opens the gate.

Another feature of the present invention is the provision in a gated barrier having a barrier frame and a gate engaged to the barrier frame, of a latch between the barrier frame and gate and engaged to one of the barrier frame and gate, where the latch includes a latch end, where the latch includes an extended position relative to the gate, where the latch includes a retracted position relative to the gate, of a latch receiver on one of the barrier frame and gate, where the latch end is receivable in the latch receiver when the latch is in the extended position, where the latch end is movable downwardly out of the latch receiver when the latch is in the extended position, and of the gate being movable vertically in the barrier plane when the latch is in the extended position.

Another feature of the present invention is the provision in a gated barrier having a barrier frame and a gate engaged to the barrier frame, of the gate having a gate axis on which the gate swings into and out of the barrier plane, where the gate includes a proximal end and a distal end, where the proximal end confronts the gate axis, and where a direction running from the proximal end to the distal end defines a width direction.

Another feature of the present invention is the provision in a gated barrier having a barrier frame and a gate engaged to the barrier frame, of the gate having a gate frame, where the gate frame has first and second vertically extending support members confronting each other and being spaced apart from each other, where the first and second vertically extending support members define a first width therebetween, and where the gate frame has first and second lower horizontally extending support members confronting each other and being spaced apart from each other.

Another feature of the present invention is the provision in a gated barrier having a barrier frame and a gate engaged to the barrier frame, of a foot opening in the gate frame, where the foot opening is between the first and second lower horizontally extending support members, where the foot opening has an opening width defined by a direction running from the proximal end of the gate to the distal end of the gate, where the foot opening is free of the first and second vertically extending support members and free of further vertical support members, where the foot opening is free of said first and second horizontally extending support members and free of further horizontally extending support members, where the foot opening is optionally empty space, where the opening width of the foot opening is greater than the first width defined by the first and second vertically extending support members such that a foot can be inserted into the opening and pressed down on one of the first and second lower horizontally extending support members, and where the opening width is less than a width between the proximal and distal ends of the gate.

Another feature of the present invention is the provision in a gated barrier having a barrier frame and a gate engaged to the barrier frame, of the gate including four corner portions, where a first corner portion is an upper corner portion and proximal to the gate axis, where a second corner portion is an upper corner portion and distal of the gate axis, where a third corner portion is a lower corner portion and proximal to the gate axis, where a fourth corner portion is a lower corner portion and distal of the gate axis, and where the foot opening is adjacent to the third corner portion.

Another feature of the present invention is the provision in a gated barrier having a barrier frame and a gate engaged to the barrier frame, of the gate including four corner portions, where a first corner portion is an upper corner portion and proximal to the gate axis, where a second corner portion is an upper corner portion and distal of the gate axis, where a third corner portion is a lower corner portion and proximal to the gate axis, where a fourth corner portion is a lower corner portion and distal of the gate axis, and where the foot opening is in the third corner portion.

Another feature of the present invention is the provision in a gated barrier having a barrier frame and a gate engaged to the barrier frame, of the gate frame including a lowermost horizontally extending support member, and of one of the first and second lower horizontally extending support members of the gate frame being the lowermost horizontally extending support member of the gate frame.

Another feature of the present invention is the provision in a gated barrier having a barrier frame and a gate engaged to the barrier frame, of the barrier frame including a first end and a second end, of the gate being disposed between the first and second ends of the barrier frame, and of the barrier frame including a lowermost horizontally extending support member tying together the first and second ends of the barrier frame, where the lowermost horizontally extending support member of the barrier frame confronts and is spaced from one of the first and second lower horizontally extending support members of the gate frame.

Another feature of the present invention is the provision in a gated barrier having a barrier frame and a gate engaged to the barrier frame, of the gate having a gate frame and of the gate frame forming a foot opening such that, when a foot is inserted into the foot opening and presses down on a foot portion of the gate frame forming the foot opening, a downward and vertical force is exerted upon the gate.

Another feature of the present invention is the provision in a gated barrier having a barrier frame and a gate engaged to the barrier frame, of a pivoting stop on the gate, where the pivoting stop includes an upper stop portion and a lower stop portion and a pivot between the upper stop portion and the lower stop portion, and where the pivot engages the pivoting stop to the gate.

Another feature of the present invention is the provision in a gated barrier having a barrier frame and a gate engaged to the barrier frame, of the upper stop portion of the pivoting stop being normally in the foot opening and normally in the gate plane, and of the upper stop portion being pivotable out of the foot opening and out of the gate plane.

Another feature of the present invention is the provision in a gated barrier having a barrier frame and a gate engaged to the barrier frame, of the lower stop portion of the pivoting stop being disposed out of the foot opening and normally in the gate plane at a stop position between the gate and a stopping surface, where the stopping surface is one of a portion of the barrier frame and an environmental surface on which the barrier frame rests, and where the lower stop portion is pivotable out of the gate plane.

Another feature of the present invention is the provision in a gated barrier having a barrier frame and a gate engaged to the barrier frame, of the gate being movable downwardly and vertically when a force is exerted upon it, and of the lower stop portion when in the gate plane in the stop position hitting the stopping surface to minimize downward and vertical travel of the gate.

Another feature of the present invention is the provision in a gated barrier having a barrier frame and a gate engaged to the barrier frame, of the upper stop portion being pivotable out of the gate plane, and of the lower stop portion also being pivotable out of the gate plane and out of said stop position.

Another feature of the present invention is the provision in a gated barrier having a barrier frame and a gate engaged to the barrier frame, of the lower stop portion being pivotable out of the stop position such that the gate may be moved downwardly and vertically.

Another feature of the present invention is the provision in a gated barrier having a barrier frame and a gate engaged to the barrier frame, of the lower stop portion including an underside face section that makes contact with the stopping surface, where the underside face section is flat to minimize tilting of said lower stop portion and any subsequent pivoting of the pivoting stop when a downward force is exerted upon the gate and the underside face section hits the stopping surface.

Another feature of the present invention is the provision in a gated barrier having a barrier frame and a gate engaged to the barrier frame, of the lower stop portion swingable out of the stop position, and of the lower stop portion automatically swingable by gravity back to the stop position in the gate plane.

Another feature of the present invention is the provision in a gated barrier having a barrier frame and a gate engaged to the barrier frame, of the upper stop portion being swingable in a first direction out of the gate plane and in a second direction out of the gate plane such that the pivoting stop can be operated from either side of the gate.

Another feature of the present invention is the provision in a gated barrier having a barrier frame and a gate engaged to the barrier frame, of the foot portion of the gate frame including an upper side, of the upper stop portion including a side face, and of the upper stop portion being pivotable out of the foot opening to a right angle location where the pivoting stop is generally at a right angle to the gate plane and where the upper side of the foot portion and the side face of the upper stop portion define a plane.

Another feature of the present invention is a latch apparatus for latching a first piece to a second piece.

Another feature of the present invention is the provision in a latch apparatus that latches a first piece to a second piece, of a main latch housing, where the main latch housing is engaged to one of the first and second pieces, where the main latch housing includes a latch, where the latch includes a distal latch end, where the latch has an extended position and a retracted position, and where the latch is slideable between the extended and retracted positions.

Another feature of the present invention is the provision in a latch apparatus that latches a first piece to a second piece, of a latch receiver housing, where the latch receiver housing is engaged to the other of the first and second pieces, where the latch receiver housing includes a latch receiver receiving the distal latch end of the latch to latch the first piece to the second piece, where the latch receiver is defined by a first side, a second side, an end side, a top side, and a bottom side, where the latch receiver includes an end opening opposite the end side such that the distal end of the latch can slide from the retracted position to the extended position and into the latch receiver, where at least one of the top and bottom sides of the latch receiver is open such that the latch can be drawn out of the latch receiver through the at least one top and bottom side when the latch is in the extended position.

Another feature of the present invention is the provision in a latch apparatus that latches a first piece to a second piece, of the bottom side of the latch receiver being open such that the latch in the extended position exits the latch receiver through the bottom side of the latch.

Another feature of the present invention is the provision in a latch apparatus that latches a first piece to a second piece, of the first piece being a barrier and of the second piece being a gate in the barrier.

Another feature of the present invention is a barrier having a gate that as a whole, and in unison with a latch in a fully extended position, is pushed downwardly relative to the barrier to open the gate relative to the barrier, where the barrier includes a latch receiver that is bottomless.

An advantage of the present invention is that the gate is operated by a foot. Feet may be free when arms and hands are occupied with carrying children or groceries.

Another advantage of the present invention is that the foot operation is associated with neither a horizontal extension nor a horizontal retraction of the latch of the gate.

Another advantage of the present invention is that the foot operation draws the latch downwardly out of a bottomless latch receiver to disengage the latch from the latch receiver and to disengage the gate from the barrier frame.

Another advantage of the present invention is that to unlatch the latch from the latch receiver and permit the gate to open, the latch is neither extended nor retracted.

Another advantage is that the gate as a whole acts as, or is substituted for, a pedal. A foot is inserted into a foot opening and is pressed down on a portion of the gate frame. This action draws the latch of the gate out of a bottomless latch receiver and permits the gate to swing relative to the barrier frame. There is no need for moving parts, with the exception of the gate frame itself, between foot and the latch to disengage the latch relative to the latch receiver. There is no need for a cable between a foot pedal and a latch.

Another advantage of the present invention is a hands free gate. The present gate requires no hands for operation, such as no hands for opening the gate and no hands for closing the gate.

Another advantage of the present invention is a pedal free gate where a pedal is defined as a foot operated part that, when depressed, pivots relative to the gate frame, or pivots so as to transmit, through a linkage such as a cable or wire, a force or motion that initiates an action at a distant location, such as at the latch of the gate.

Another advantage of the present invention is safety. Where an unintended force is exerted upon the gate in the downward and vertical direction, a stop minimizes or prevents the downward and vertical movement. An example of an unintended force is where a person leans upon the gate with no intention of opening the gate. An intended downward and vertical force is where a person inserts his or her foot into a foot opening so as to intend to push the gate down to unlatch the latch and thereupon to push or swing the gate open. The operation of inserting one's foot into the foot opening pivots the stop, namely, rotates an upper stop portion of the stop one way in one direction of rotation and rotates the lower stop portion of the stop in the same direction of rotation to an out-of-the-way position such that the gate can move downwardly and vertically, such that the latch can exit the bottomless latch receiver, and such that the gate can be swung open.

Another advantage of the present invention is that the stop is embodied in the shape of a pedal such that the stop may be operated by the foot. In other words, a pedal has been selected to work as a pivoting stop.

Another advantage of the present invention is a hands free gate that may be operated by hand if desired, such as being opened by hand or closed by hand. The latch may be extended and retracted by hand.

DESCRIPTION

Figure 1A:
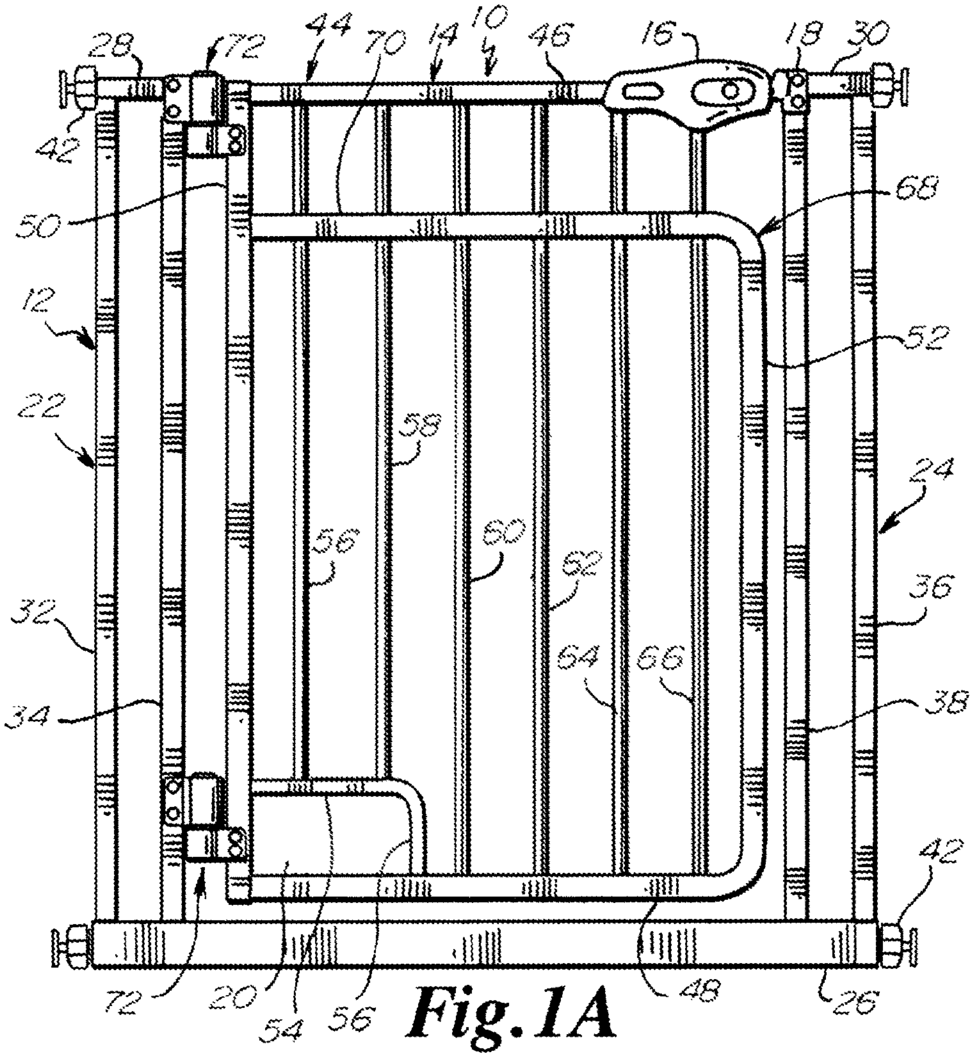
FIG. 1A is a front view of the present hands free gate.
Figure 1B:
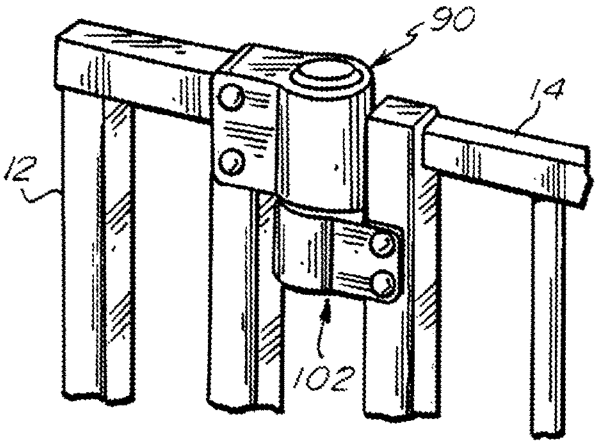
FIG. 1B is a detail perspective view of a hinge connection between the barrier frame and gate of the hands free gate of FIG. 1A.
Figure 1C:
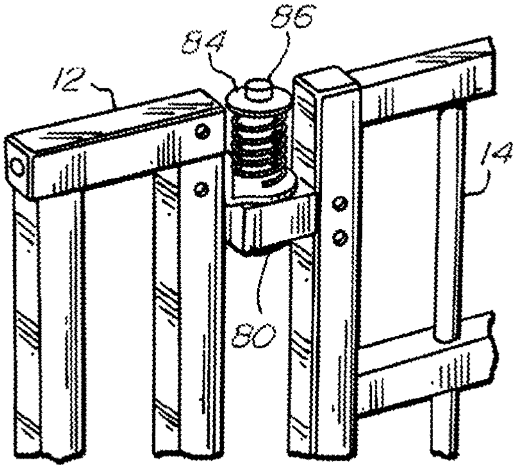
FIG. 1C is a detail perspective view of the hinge connection of FIG. 1B with protective safety coverings removed.
Figure 2A:
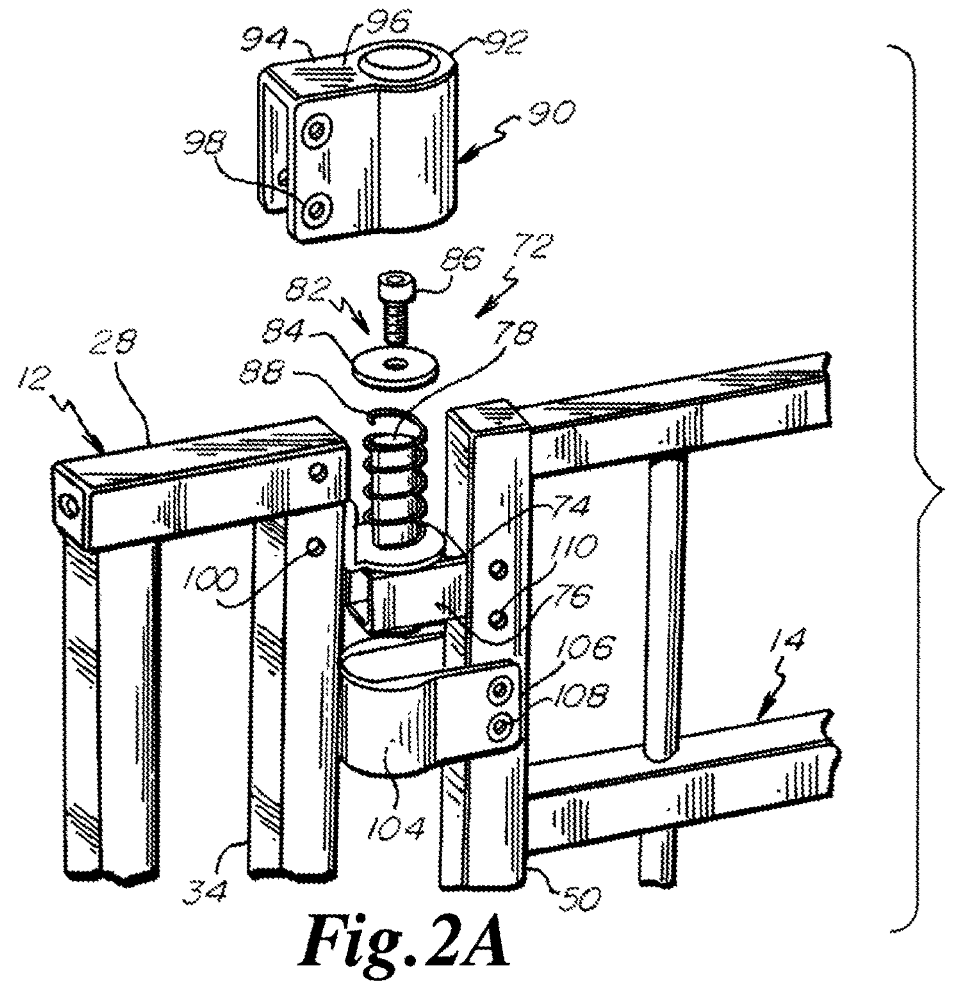
FIG. 2A is a detail perspective exploded view of the hinge connection of FIG. 1B.
Figure 2B:
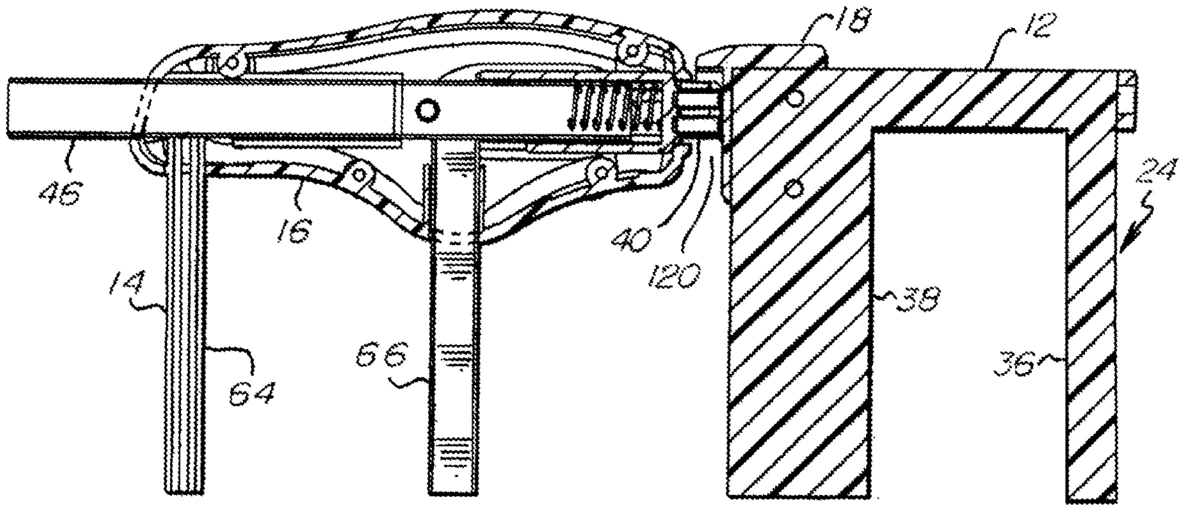
FIG. 2B is a partially section view of a latch apparatus of the hands free gate of FIG. 1A where each of a latch and latch receiver is shown and where a portion of the hands free gate of FIG. 1A is shown.
Figure 3A:
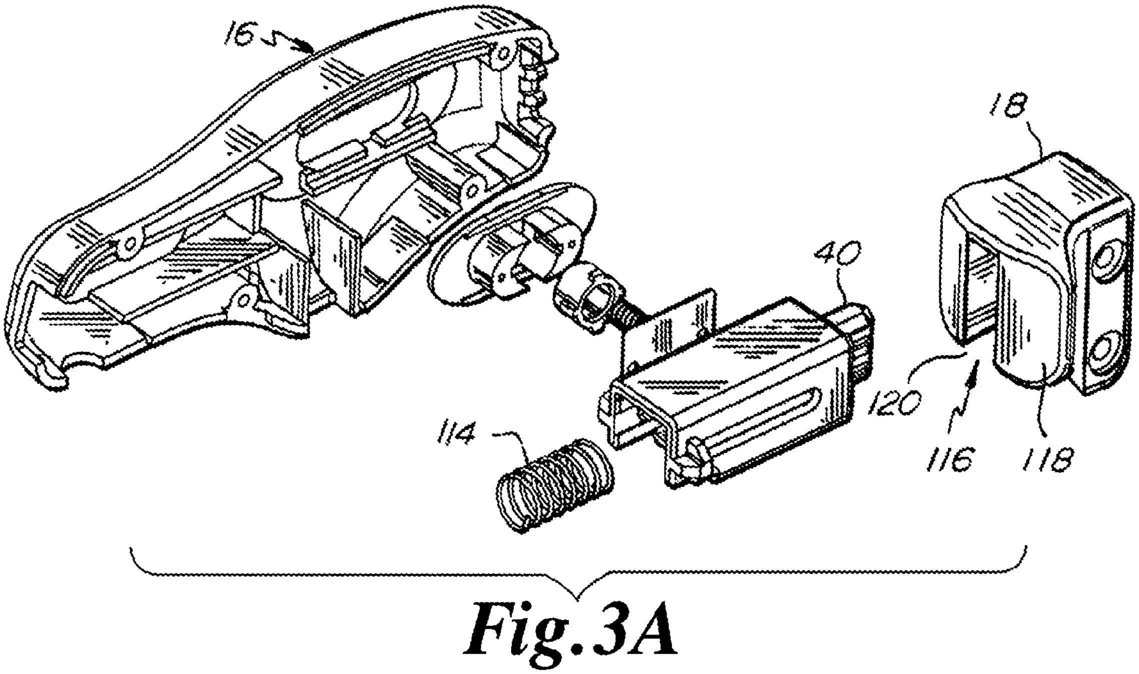
FIG. 3A is a detail perspective exploded view of a portion of the latch apparatus of FIG. 2B where each of the latch and latch receiver is shown.
Figure 3B:
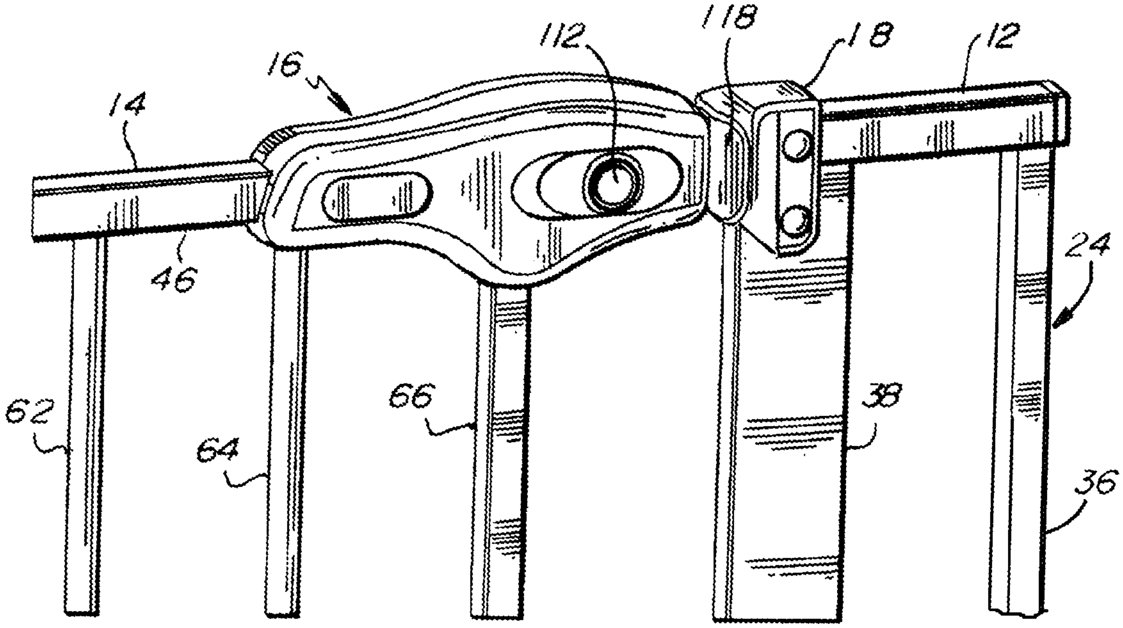
FIG. 3B is a detail perspective view of the latch apparatus of FIG. 2B where the latch is received in the latch receiver and where a portion of the hands free gate of FIG. 1A is shown.

As shown in FIG. 1, the present hands free gate or gated barrier is indicated by reference number 10. Gated barrier 10 generally includes a barrier frame 12, a gate 14 engaged in the barrier frame 12, a latch apparatus 16 including a latch receiver housing 18, and a foot opening 20.

Barrier frame 12 includes a first end 22 and a second end 24. A lower horizontally extending support member or tie bar 26 extends between the ends 22, 24. A pair of upper horizontally extending support members 28, 30 define respective top portions of the first and second ends 22, 24. First end 22 of barrier frame 12 includes an outer vertical support member 32 and an inner vertical support member 34 that run to and between lower and upper horizontally extending support members 26, 28. Second end 24 of barrier frame 12 includes an outer vertical support member 36 and an inner vertical support member 38 that run to and between lower and upper horizontally extending support members 26, 30.

Barrier frame 12 may be a pressure frame. That is, when manufactured, one of the ends 22, 24 may be set at an oblique angle relative to tie bar 26. Then, when set up in an operating position such as in a door frame, the oblique end 22 (or 24) is pushed into a right angle relationship with the tie bar 26 so as to push the latch receiver housing 18 to be adjacent to the latch apparatus 16 having a latch 40 that is received in the latch receiver housing 18. To push the end 22 (or 24) into such a right angle relationship with the tie bar 26 so as to engage the gated barrier 10 to a door frame, hand screws 42 extend from the outer ends of tie bar 26 and from the outer ends of upper horizontal support members 28, 30. If desired, gated barrier 10 may be a portion of an outside fence or a wooden self-standing gate intended for inside use.

Gate 14 includes a gate frame 44. Gate frame 44 includes an upper or uppermost horizontally extending support member 46, a lower or lowermost horizontally extending support member 48, an inner end or proximal vertical support member 50, and an outer end or distal vertical support member 52. Inner end or proximal vertical support member 50 is joined to uppermost horizontally extending support member 46 and lowermost horizontally extending support member 48. Foot opening 20 is defined by a perimeter consisting of a lower horizontally extending support member 54, a vertical support member 56, a portion of lowermost horizontal support member 48 and a portion of vertical support member 50.

Gate frame 44 further includes vertical support members 56, 58 running to and between lower horizontal support member 54 and uppermost horizontal support member 46. Vertical support members 56, 58 are foreshortened relative to vertical support member 50.

Gate frame 44 further includes vertical support members 60, 62, 64 and 66 running to and between lowermost horizontally extending support member 48 and uppermost horizontally extending support member 46. Vertical support members 64, 66 extend through latch apparatus housing 16 to be engaged to uppermost horizontally extending support member 46.

Gate frame 44 further includes a U-shaped integral one-piece support member 68 that is formed of a horizontally extending support member 70, vertically extending support member 52, and lowermost horizontally extending support member 48. Lowermost horizontally extending support member 48 and upper horizontally extending support member 70 are engaged to the inner end vertical support member 50 and run distally therefrom to the outer end vertically extending support member 52. Vertical support members 56, 58, 60, 62, 64, 66 run through and are engaged to the upper horizontally extending support member 70. If desired, vertical support members 56, 58, 60, 62, 64, 66 may terminate at the underside of upper horizontally extending support member 70, with aligned and corresponding support members continuing from the upper side of upper horizontally extending support member 70 to the uppermost horizontally extending support member 46.

A pair of upper and lower hinge connections 72 engage the gate 14 to the barrier frame 12. The upper and lower hinge connections are identical to each other. The hinge connections 72 define a vertical axis on which the gate 14 swings.

Hinge connection 72 includes a rigid portion extending from the barrier frame 12. This rigid portion is a rigid bracket 74 extending from and rigidly connected to the inner vertically extending support member 34 of the barrier frame 12. Bracket 74 includes a vertically extending portion that is fixed to support member 34 and a disk shaped horizontally extending portion.

Hinge connection 72 further includes a rigid portion extending from the gate 14. This rigid portion is a rigid tube 76 extending horizontally from inner end vertically extending support member 50. Rigid tube 76 includes upper and lower faces. The upper face of rigid tube 76 confronts the disk shaped portion of bracket 74 when the gate 14 is in a resting uncompressed state.

Hinge connection 72 further includes a main pin or pivot pin 78 extending through an opening in the disk shaped portion of rigid bracket 74 and further extending through openings in the upper and lower faces of rigid tube 76. Main pin 78 includes a lower head 80 that confronts the lower face of rigid tube 76. An upper head 82 of main pin 78 consists of a washer 84 engaged to main pin 78 by a pin connector 86. The threaded shaft of pin connector 86 engages axially the body of the main pin 78. A coil spring 88 is contained or captured between main pin head 82 and the upper face of the disk shaped portion of the rigid bracket 74. The coil spring 88 is disposed about the main pin 78 and is coaxial therewith. When gate 14 is pushed downwardly such as by a foot being inserted into opening 20 and pushing downwardly on lowermost horizontally extending support member 48, coil spring 88 is compressed by the rigid tube 76 drawing downwardly the lower main pin head 80, which in turn draws downwardly the upper main pin head 82, which in turn brings pressure to bear on the top portion of the coil spring 88 and then squeezes the coil spring 88 between the upper pin head 82 and the disk shaped portion of the bracket 74. When the foot is withdrawn from the foot opening 20 or is lifted from the lowermost horizontally extending support member 48, the coil spring 88 extends to thereby push the upper pin head 82 upwardly, which draws the lower pin head 80 upwardly, which draws the rigid tube 76 upwardly, which draws the gate 14 upwardly relative to the barrier frame 12.

A safety protective piece or shield 90 is pinned or riveted to vertically extending support member 34 of the barrier frame 12. The shield 90 includes a cylindrical portion 92 that is placed over the coil spring 88, main pin 78, and main pin head 82 including the washer 84 and pin connector 86. Cylindrical portion 92 is coaxial with the main pin 78. The shield 90 further includes a parallelepiped or box portion 94 that is pinned or riveted to the barrier frame 12. Shield 90 further includes a closed upper end 96 that extends over each of the cylindrical portion 92 and box portion 94 to minimize fingers being pinched in the hinge connection 72. Pin connector openings 98 of the shield 90 are aligned with pin connector openings 100 found in each of the vertically extending support member 34 and horizontally extending support member 28 of the barrier frame 12.

A safety protective piece or shield 102 is pinned or riveted to vertically extending support member 50 of gate 14. The shield 102 includes a portion 104 having, on its exterior, a cylindrical shape. Portion 104 leads into a pair of flanges 106 having pin openings 108. Pin openings 108 are aligned with and correspond to pin openings 110 found in vertical support member 50. Portion 104 includes a parallelepiped interior that, along with flat interior faces of flanges 106, receive the box like rigid tube 76. Portion 104 may include a closed bottom end that confronts the lower face of rigid tube 76 and the lower head 80 of main pin 78. Protective shield 102 minimizes the pinching of fingers in hinge mechanism 72 by covering up at least portions of one or more of the rigid tube 72, the lower head 80, the disk shaped portion of rigid bracket 74 and the main pin 78.

Latch apparatus 16 includes a latch 40. Latch 40 is retractably slideable in the horizontal direction by the operation of one or more buttons 112 found on each of the faces of the latch apparatus 16. A coil spring 114 biases the latch 40 to the extended position, i.e., to the position where the distal end of the latch 40 is received in a bottomless latch receiver 116 that is engaged to the distal end 24 of the barrier frame 12. The latch receiver housing 18 includes oblique or angled or tapering faces 118 that lead into the latch receiver 116 and that force slight retraction of the latch 40 when the gate 14 is swinging to a closed position such that the latch is relatively and momentarily foreshortened until the coil spring 114 urges the latch 40 to extend to the extended position for reception in the latch receiver 116. The latch receiver 116 includes a proximal or front open end and that lies in a plane at a right angle to the plane of the barrier frame 12. The obliqueness or tapering or angle of the faces 118 is relative to the plane of the barrier frame 12 and to the plane of the proximal or front open end of latch receiver 116.

The latch receiver 116 is formed by a pair of inner side faces disposed vertically, by an end face disposed vertically, and by a top face or ceiling disposed horizontally. Opposing the top face or ceiling is an open bottom end 120. This open bottom end 120 permits the latch 40 to exit the latch receiver 116 and latch receiver housing 18 when a foot is inserted into foot opening 20 and presses downwardly upon lowermost horizontally extending support member 48, an action that draws the gate 14 and latch 40 downwardly in unison. The height of the side faces of latch receiver 116 may be greater or lesser than or about the same height as the height of the latch 40. Latch 40 when drawn down clears the latch receiver 116 prior to when the lower surface of lowermost horizontally extending support member 48 makes contact with the upper surface of tie bar 26.

In operation, to install the gate in a residence, the gated barrier 10 is placed between two vertical surfaces, such as in a doorway. Then the hand screws 42 are rotated to engage the vertical surfaces until one or more of the ends 22, 24 of the barrier frame 12 are pushed into a right angle relationship with the tie bar 26, whereupon the latch 40 is drawn into and becomes fully engaged with the latch receiver 116. In such a position, the gated barrier 10 may be resting on the floor or spaced from the floor. As noted above, however, the gated barrier 10 may not be a pressure gate. Barrier frame 12 may be a portion of an outside gate or fence or a portion of another type of inside residential barrier or gate such as a stand-alone gate or a gate or barrier that engages to vertical surfaces in a home in a different manner, i.e., without hand screws and/or without being a pressure gate.

Once installed, a person carrying bags of groceries may encounter the gated barrier 10. This person may more safely keep the bags of groceries in his or her arms, insert a foot into foot opening 20, and press down on lowermost horizontally extending support member 48. This action of pressing down with his or her foot upon support member 48 compresses hinge connections 72, draws the latch 40 down and out of the bottomless latch receiver 116, and permits the person to nudge the gate 14 to swing the gate 14 in either the forward or rearward direction. This action of pressing down with his or her foot upon lowermost horizontally support member 48 draws lowermost horizontally extending support member 48 downwardly in the plane of gated barrier 10 and toward the tie bar 26. Prior to the lowermost horizontally extending support member 48 making contact with the tie bar 26, the upper face of the latch 40 clears bottom portions of the latch receiver housing 18 such that gate 14 can swing out of the plane of the barrier frame 12 and in either the forward or rearward direction. When the person releases the gate 14 with his or her foot, or releases the downward pressure upon lowermost horizontally support member 48, the gate 14 is drawn upwardly relative to the barrier frame 12 by the expanding hinge connections 72. Thus, if the person decides not to go through the gate 14 and maintains the gate 14 in the plane of the barrier frame 12, the latch 40 rises through the bottomless latch receiver 116 to again become engaged in the latch receiver 116. If the person decides to go through the gate 14 and has nudged the gate 14 to swing the gate 14 out of the plane of the barrier frame 12, the person walks over tie bar 26 and through the opening provided by the gate 14 having been swung. Then the person may nudge the gate 14 with a foot to swing the gate 14 back toward the plane of the barrier frame 12. The normally extended latch 40 swings in unison with the gate 14, engages one of the angled faces 118 of the latch receiver housing 18, is pushed by such angled or tapering or oblique face 118 inwardly to be partially retracted, encounters the space of the latch receiver 116, and pops into the latch receiver 116 under the force of the latch coil spring 114 to stop the gate 14 in the plane of the barrier frame 12.

It should be noted that the person carrying the bags of groceries may decide not to open the gate 14 with a foot. Instead the person may open the gate 14 by hand. Here the person slides one or both of the buttons 112 in the proximal direction, which draws the latch 40 in the proximal direction and horizontally out of the latch receiver 116, which permits the gate 14 to swing in either the forward or rearward direction. Then the person may walk through the opening left by the open gate 14. Then the person may nudge the gate 14 with a hand or foot to swing the gate 14 toward the plane of the barrier frame 12, whereupon the gate 14 shuts automatically by the latch 40 encountering one of the angled faces 118. If desired, the person may again operate one or more of the buttons 112 by hand to slide the latch 40 in the proximal direction, then swing the gate 14 into the plane of the barrier frame 12, and then by hand release the button 112 or buttons 112 to permit the latch 40 to engage the latch receiver 116 without encountering one of the angled faces 118.

The latch 40 is swingable out of the plane of the barrier frame 12 when the latch 40 is in the fully extended position, i.e., when the latch 40 is pushed outwardly by the force of the latch coil spring 114 and such outward sliding movement is limited by one or more stops found in the latch apparatus 16. In other words, in the fully extended position, the latch 40 is capable of following a right angle path. In still other words, latch 40 first follows a downward and vertical path when a person inserts a foot into foot opening 20 and presses upon the lowermost horizontal support member 48 and then follows a horizontal and circular path after the latch 40 clears the bottom of the latch receiver housing 18 and the gate 14 begins to swing.

The latch 40 is swingable out of the plane of the barrier frame when the latch 40 is in a sufficiently retracted position, i.e., when the latch 40 is drawn sufficiently inwardly or proximally to clear inner vertical surfaces of the latch receiver housing 18. In other words, in this retracted position, the latch 40 moves out of the plane of the barrier frame by following a horizontal and circular path.

The gate 40 is movable vertically in the plane of the barrier frame 12 when the latch 40 is in the fully extended position. In other words, a person may insert a foot into the foot opening 20, draw down the gate 14 with his or her foot on the lowermost horizontally support member 48 to vertically and downwardly draw the latch 40 out of the bottomless latch receiver 116. Then the person may lift his or her foot to release the lowermost horizontally extending support member 48, whereupon the compressed hinge connections 72 expand, and whereupon the fully extended latch 40 travels upwardly and vertically into the bottomless latch receiver 116.

Downward and vertical pressure from a hand or foot upon any portion of the gate 14 also pushes the fully extended latch 40 downwardly and vertically out of the latch receiver 116. Such any portion of the gate 14 includes downward pressure upon the latch apparatus 16, upon upper horizontally extending support member 70, upon lower horizontally extending support member 54, and upon portions of the lowermost horizontally extending support member 48 disposed between any two pairs of the vertical support members such as pair 56, 60 or pair 60, 62 or pair 62, 64, or pair 64, 66 or pair 66 and 52.

Downward and vertical pressure can also be provided by a hand gripping one or more portions of the gate 14, including vertically running portions and horizontally running portions, with such downward pressure resulting in vertically moving the fully extended latch 40 out of the bottomless latch receiver 116. Hand gripping includes hand squeezing.

Foot opening 20 has an opening width defined by a direction running from the proximal end of the gate 14, such as support member 50, to the distal end of the gate 14, such as support member 52. Foot opening 20 is free of vertically extending support members such as members 50, 56, 58, 60, 62, 64, 66 and 52. Foot opening 20 is free of further vertical support members. Foot opening 20 is free of horizontally extending support members such as support members 48, 54, 70 and 46. Foot opening 20 is free of further horizontally extending support members. Foot opening 20 is optionally open and empty space. The opening width of the foot opening 20 is greater than a first width defined by any one pair of vertical support members such as pair 50, 56 or pair 56, 58 or pair 58, 60 or pair 60, 62 or pair 62, 64 or pair 64, 66 or pair 66, 52 such that a foot can be inserted into the foot opening 20 and press down on the lowermost horizontally extending support member 48. The width of foot opening 20 is less than a width between the proximal and distal ends of the gate 14, where such width is defined by a distance between vertical support members 50 and 52.

Foot opening 20 is preferably in or adjacent to a corner portion defined by the proximal end of lowermost horizontally extending support member 48 and the lowermost end of support member 50. Other corner portions of the gate 14 include a corner portion defined by the proximal end of uppermost horizontally extending support member 46 and the upper end of support member 50, a corner portion defined by the distal end of uppermost horizontally extending support member 46 and the upper end of support member 52, and a corner portion defined by the distal end of lowermost horizontally extending support member 48 and the lower end of support member 52.

Foot opening 20 is preferably adjacent to or preferably confronts a swing axis of the gate 14, where the swing axis is defined by main pin 78 of each of the hinged connections 72. At such a location, less movement of a foot translates into a greater arc like movement to the distal end of the gate 14. In other words, with the foot opening 20 adjacent to the distal end of the gate 14, a person moves his or her foot a greater distance to effectuate a swinging of the gate 14. Further, at such a location close to the swing axis of the gate 14, such downward foot movement places less strain on the hinged connections 72 since such downward foot movement is physically close to and thereby offers less leverage to the lower hinged connection 72 and is more of a parallel force to the gate axis than would be a force exerted at the corner defined by the lower end of support member 52 and the distal end of lowermost horizontally extending support member 48.

If the portion of the lowermost horizontally extending support member 48 that defines foot opening 20 is defined as a pedal, it is noted that such portion lies in the plane of the barrier frame 12 and in the plane of the gate 14 and that such portion does not extend transversely out of such planes.

If the portion of the lowermost horizontally extending support member 48 that defines foot opening 20 is defined as a pedal, it is noted that such portion does not pivot relative to the gate 14 either at a location at or near the foot opening 20 or at a location spaced from and at a distance from foot opening 20.

If the portion of the lowermost horizontally extending support member 48 that defines foot opening 20 is defined as a pedal, it is noted that such portion is part of the structural support of the frame of the gate 14.

If the portion of the lowermost horizontally extending support member 48 that defines foot opening 20 is defined as a pedal, it is noted that such portion runs horizontally, that such portion runs in the plane of the barrier frame 12 and in the plane of the frame of the gate 14, that such portion is spaced from and adjacent to another horizontally extending support member, and that such horizontally extending support members optionally define an empty space therebetween to attract the attention of a person seeking to open the gate 14.

The vertical and horizontal support members of the barrier frame 12 and gate 14 are preferably tubular and rectangular or square in section or circular in section, and are preferably formed of a metal such as aluminum or steel. However, such support members may be formed of another material such as wood or a wood product. Support members 56, 58, 60, 62, 64, and 66 may be circular in section. The remaining support members may be square or rectangular in section.

The U-shaped piece or support member 68 (or integral support members 70, 52 and 48) is preferably formed of a piece having the same cross sectional shape and size as support members 32, 34, 50, 38, 36 and 46. Such a cross sectional size or width may be greater than the cross sectional size or width of circular support members 56, 58, 60, 62, 64 and 66. Tie bar 26 has a cross sectional size greater than support members 68, 32, 34, 50, 36 and 46. The right angle piece consisting of integral tubular support members 54 and 56 and partially defining foot opening 20 may have a cross sectional size smaller than support members 68, 32, 34, 50, 36 and 46. Support members 54, 56 are square or rectangular in section.

The height of the foot opening 20 is sufficiently great to permit the shoe of an adult to enter the foot opening 20. The height of the foot opening 20 is sufficiently small to minimize the chances of a medium size dog to pass therethrough or of a toddler to crawl therethrough.

The height of the foot opening 20 is preferably between one and 12 inches, more preferably between one and six inches, still more preferably between one and five inches, and yet more preferably between one and four inches.

The width of the foot opening 20 is preferably between three inches and the entire width of the gate 14 from support member 50 to support member 52, more preferably between three inches and 18 inches, more preferably between three inches and 16 inches, more preferably between three inches and 14 inches, more preferably between three inches and 12 inches, more preferably between three inches and 10 inches, more preferably between three inches and eight inches, and more preferably between three inches and six inches.

As to the latch apparatus 16 and other portions of the present gated barrier 10, U.S. patent application Ser. No. 14/181,660 filed Feb. 15, 2014 and entitled Squeeze And Slide To Open Gate Latch is hereby incorporated by reference in its entirety. For example, as to such other portions of the present gated barrier 10, it should be noted that the gate of U.S. patent application Ser. No. 14/181,660 includes a stop at the lower end of a vertical support member to stop the swinging of the gate relative to the tie bar such that such gate swings only in one direction.

As to the present gated barrier 10 and as to employing a lower latch apparatus interacting with tie bar 26, where latch apparatus 16 is an upper latch apparatus, U.S. Provisional Patent Application No. 61/921,029 filed Dec. 26, 2013 and entitled Double Door Gate Apparatus is hereby incorporated by reference in its entirety. For example, it should be noted that the main gate of U.S. Provisional Patent Application No. 61/921,029 includes a lower latch apparatus at the lower end of a vertical support member of a main gate that automatically interacts with the tie bar and that permits the main gate to swing in both directions. This lower latch apparatus may be modified for the present invention to include a latch that automatically retracts upwardly and vertically and automatically extends downwardly and vertically, such as by employing a coil spring, when a foot respectively presses down upon and is released from the lowermost horizontally extending support member 48.

Figure 4:
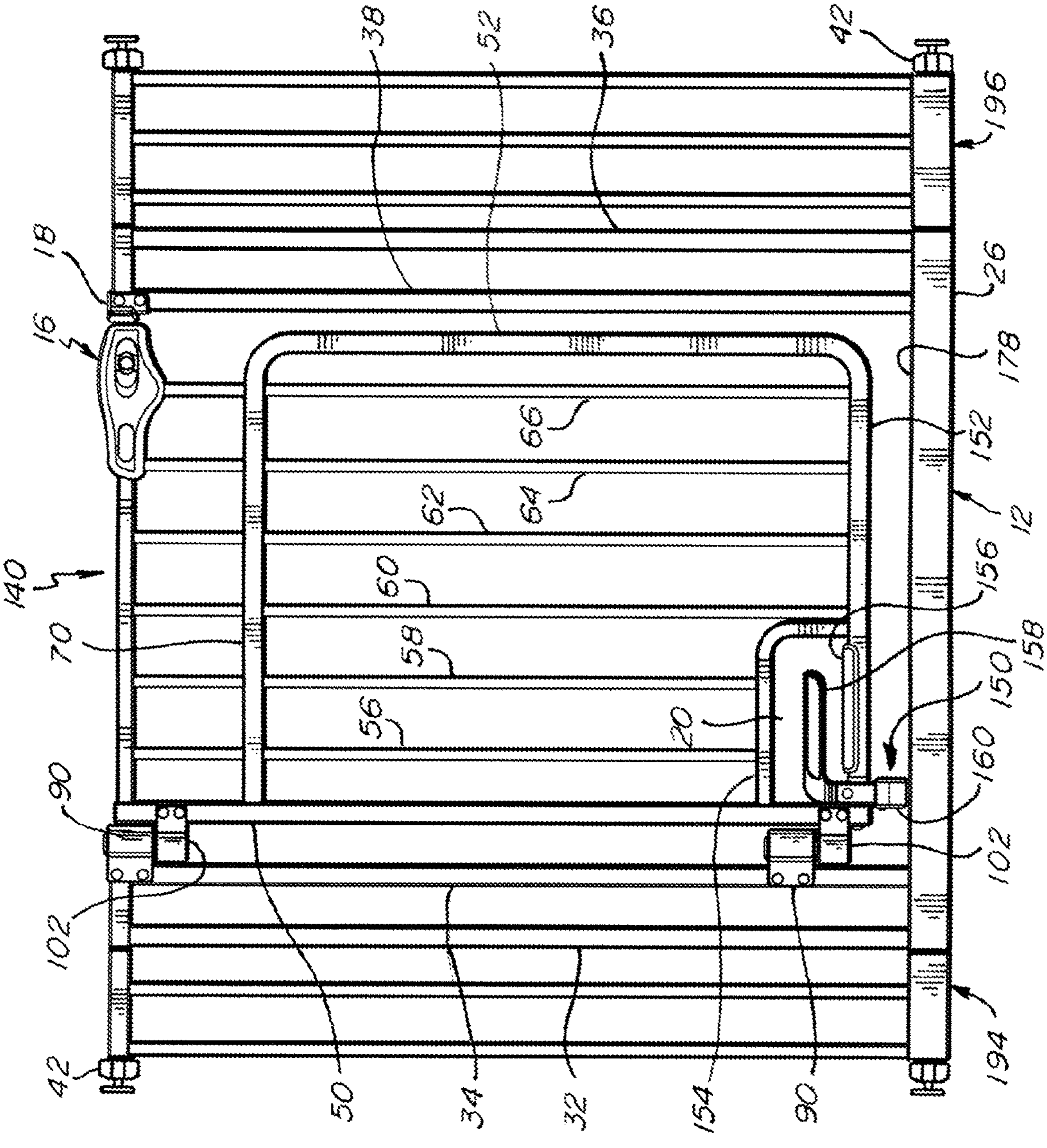
FIG. 4 is a front view of an improved hands free gate having a pivoting stop, a portion of which is disposed in a foot opening.

FIG. 4 shows an improved gated barrier 140 having a pivoting stop 150. The improved gated barrier 140 is the same as the gated barrier 10, with exceptions including the pivoting stop 150, a foreshortened lower horizontally extending frame member 152 replacing lower horizontally extending frame member 48, a greater distance between the new foreshortened lower horizontally extending frame member 152 and the tie bar 26, a lengthened horizontal support member 154 replacing horizontal support member 54, and a foot grip 156 in the foot opening 20 on the new foreshortened lower horizontally extending frame member 152.

The pivoting stop 150 minimizes or prevents a downward and vertical movement of the gate 14 until and unless the pivoting stop 150 is pivoted by a foot that is being inserted into the foot opening 20.

The pivoting stop 150 is L-shaped as a whole and includes an upper stop portion 158, a lower stop portion 160 and a pivot 162 in a middle or medial portion 164 disposed between the upper stop portion 158 and the lower stop portion 160. When a person leans upon the gate 14, for example, a downward and vertical movement is imposed upon the gate 14 and the gate 14 will slide downwardly and vertically a small amount, whereupon the lower stop portion 160 hits the tie bar 26, preventing any further downward and vertical movement by the gate 14. When a foot presses against the upper stop portion 158, the pivoting stop 150 as a whole pivots, whereupon the lower stop portion 160 pivots to an out-of-the-way position, whereupon the gate 14 may slide downwardly and vertically such that the latch 40 can exit the latch receiver 18 through the bottom open end 120 of the latch receiver 18 such that the gate 14 can swing open.

More specifically, the pivoting stop 150 includes three pieces, the upper stop portion 158, the medial stop portion 164, and the lower stop portion 160. The upper stop portion 158 is itself L-shaped, with a horizontally running elongate portion and a vertically running portion. Vertically running portion of the upper stop portion 158 is affixed to medial stop portion 164 with pin 165. The vertically running portion of the upper stop portion 158 includes a slot and a portion of the medial stop portion 164 extends into the slot of such vertically running portion of the upper stop portion 158. Medial stop portion 164 is pivotally affixed to gate 14 by pivot pin 162 extending to and between the inner end of horizontal support member 152 of gate 14 and the lower end of vertical support member 50 of gate 14. Medial stop portion 164 extends into and is affixed to cap 174 by pin 186. Lower stop portion 160 includes cap 174.

The horizontally running portion of upper stop portion 158 is disposed at a right angle to the middle portion 164 and to the lower stop portion 160. The middle portion 164 and lower stop portion 160 are coaxial with each other. The horizontally running portion of the upper stop portion 158 runs parallel to the tie bar 26, horizontal support member 152 of the gate 14, and horizontal support member 154 that forms a portion of the foot opening 20. The horizontally running portion of the upper stop portion 158 runs more than half-way the length from upright support member 168 of gate 14 to upright support member 50 of gate 14.

Upright support member 168, horizontal support member 154, upright support member 50, and horizontal support member 152 form foot opening 20.

The horizontally running portion of the upper stop portion 158 of pivoting stop 150 thus extends more than half-way across a horizontal span of foot opening 20.

The horizontally running portion of the upper stop portion 158 of pivoting stop 150 is disposed in a medial section of foot opening 20. The horizontally running portion of upper stop portion 158 is disposed somewhat closer to the horizontal support member 152 than the horizontal support member 154. The horizontally running portion of the upper stop portion 158 runs parallel to support members 152 and 154, both of which form portions of the foot opening 20. The horizontally running portion of the upper stop portion 158 is disposed adjacent to horizontal support member 152, upon which foot grip 156 is engaged such that a foot may press upon the upper stop portion 158 of the pivoting stop 150 at about the same time as the foot presses down upon the foot grip 156. The horizontally running portion of the upper stop portion 158 is disposed in generally a central to central-lower portion of the foot opening 120.

Upper stop portion 158 is a plastic or metal strip of material. The horizontally running portion of the upper stop portion 158 is elongate. The horizontally running portion of the upper stop portion 158 takes the shape of a pedal, the purpose of which is to be pressed upon by a foot to push or draw the lower stop portion 160 to an out-of-the-way position.

Middle stop portion 164 of pivoting stop 150 depends from upper stop portion 158 and extends to the lower stop portion 160 or cap 174. Middle stop portion 164 is disposed between the inner end of horizontal support member 152 and the lower end of vertical support member 50. Middle stop portion 164 runs parallel to vertical support member 50 and includes a vertical axis that is parallel to the axis on which gate 14 swings. Middle stop portion 164 runs vertically and upwardly.

Middle stop portion 164 is engaged by pivot or pivot pin 162. Pivot or pivot pin 162 runs through the lower end of vertical support member 50, through middle stop portion 164 of pivoting stop 150, and into the inner end of horizontal support member 152 of gate 14. Nonrotating pivot pin 162 is engaged to the lower end of vertical support member 50 with a vertically extending capped pin 166. The distal end of pivot pin 162 is engaged to the inner end of horizontal support member 152 with a plug 170 that plugs the inner end of the horizontal support member 152. Middle stop portion 164 swings freely with minimal friction between the inner end of horizontal support member 152 and the lower end of vertical support member 50 such that the pivoting stop 150 swings freely.

Medial portion 164 includes an integral inner section or strip 172 that extends integrally from medial portion 164.

It should be noted that, if desired, upper stop portion 158, medial portion 164, and lower stop portion 160, including cap 174, may be integral with each other and may be formed of one piece.

Lower stop portion 160 includes a cap 174 that extends about each of the four sides of inner section 172 and that further extends over the underside or distal end of inner section 172. Cap 174 includes an underside 176 that is flat. Underside 176 is spaced from, adjacent to, and confronts the upper side 178 of tie bar 26. A space 180 is disposed between underside 176 and upper side 178. The upper side 178 of the tie bar 26 is flat. The portion of the upper side 178 of the tie bar 26 that meets the underside 176 of the lower stop portion 160 of the pivoting stop 150 is flat. Such flat structures minimize the chance of the cap 174 rolling off the tie bar 26 so as to begin an unintended pivoting of the pivoting stop 150 and maximize the chance that the pivoting stop 150 stays vertical and in a functional stopping position when downward and vertical pressure is exerted on the gate 14.

Space 180 is preferably, in height, between about 2.0 centimeters and about 1.0 millimeters, more preferably between about 1.5 centimeters and about 1.0 millimeters, yet more preferably between about 1.0 centimeters and about 1.0 millimeters, still more preferably between about 0.75 centimeters and about 1.0 millimeters, and even more preferably between about 0.50 centimeters and about 1.0 millimeters. Space 180 is sufficiently great in height to permit cap 174 to swing out of the way. Space 180 is sufficiently small in height to minimize the downward and vertical distance that gate 14 travels, before underside 176 stops such travel, when it is leaned upon and when pivoting stop 150 is in a vertical plane and has not been pivoted to an out-of-the-way position.

Cap 174 includes a pair of side faces 182 that taper relative to a vertical axis of lower stop portion 160. Each of the side faces 182 extends downwardly and outwardly relative to a vertical plane defined by gate 14.

Cap 174 includes a pair of end faces 184 that extend downwardly and vertically. A pin 186 extends through the end faces 184 and through the inner portion 172 to fix the cap 174 to the medial stop portion 164.

Cap 174 includes a curved face 188 extending between tapered side face 182 and flat underside face 176. This curved face 188 permits the underside or underside face 176 to be mounted more closely to the upper side 178 of the tie bar 26 than, for example, a cap 174 with a squared off edge or transition. When the pivoting stop 150 is rotated, curved face 188 swings no closer, or minimally closer, to the upper side 178 than the flat underside face 176. Another type of transition between faces 182 and 176, such as a squared off transition, may hit the upper side 178 when the pivoting stop 150 is swung and thus may prevent a pivoting of the pivoting stop 150 to an out-of-the-way position.

Cap 174 is preferably formed of a resilient material, or a rubber or rubber like material, or an elastomeric material. The resiliency of such material permits the cap 174 to give when a downward and vertical force is exerted upon the gate 14 and the underside 176 of the cap 174 makes contact with the tie bar 26.

Cap 174 is preferably formed of a nonslip material that such that an interaction between cap 174 and the upper side 178 of the tie bar 26 minimizes sliding of the cap 174 relative to the upper side 178 such as when a downward and vertical force is exerted upon the gate 14 and the underside 176 of the cap 174 makes contact with the tie bar 26.

The mass or weight of the section of the pivoting stop 150 above pivot pin 162 is less than the mass or weight of the section of the pivoting stop 150 below the pivot pin 162. This difference in weight permits the pivoting stop 150 to return by gravity and automatically to the upright planar position, in the plane of gate 14, after the pivoting stop 150 has been pivoted to an out-of-the-way position where lower stop portion 160 is disposed out of the plane of the gate 14.

Figure 6A:
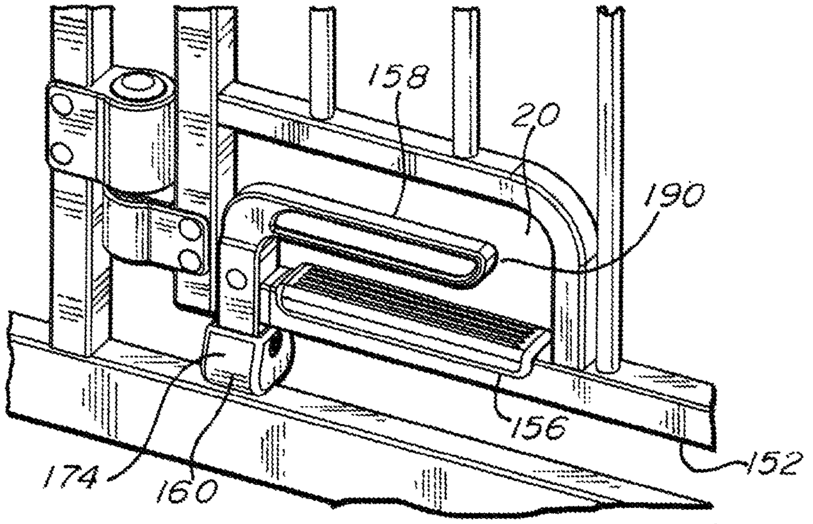
FIG. 6A is a front perspective detail view of the pivoting stop of the improved hands free gate of FIG. 4, showing the pivoting stop in a normal position, ready to stop a downward and vertical movement of the gate so as to prevent the gate from opening.
Figure 6B:
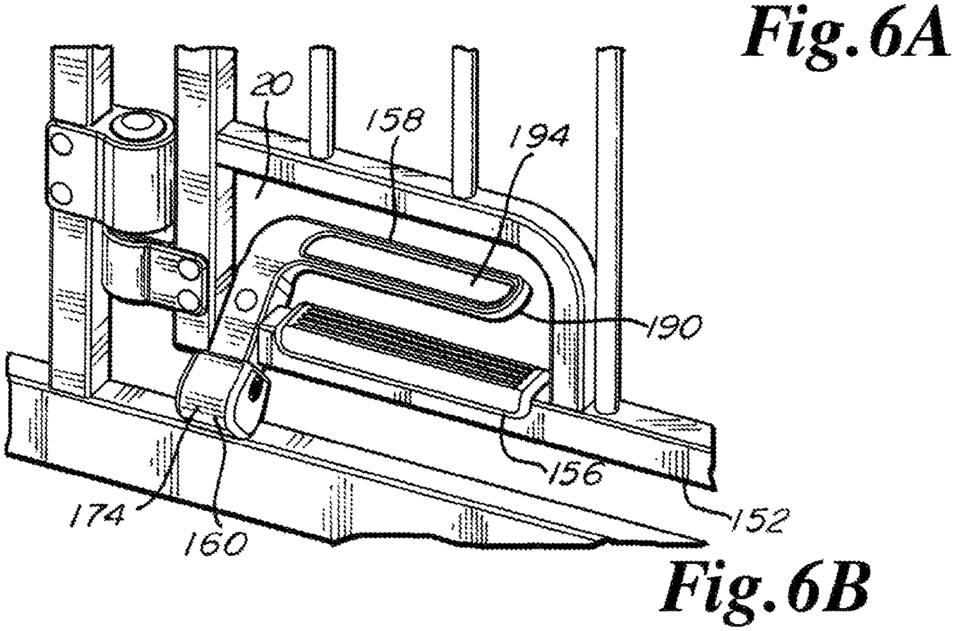
FIG. 6B is a front perspective detail view of the pivoting stop of the improved hands free gate of FIG. 4, showing the pivoting stop in a swinging position, ready to permit a downward and vertical movement of the gate so as to permit the gate to be opened.
Figure 6C:
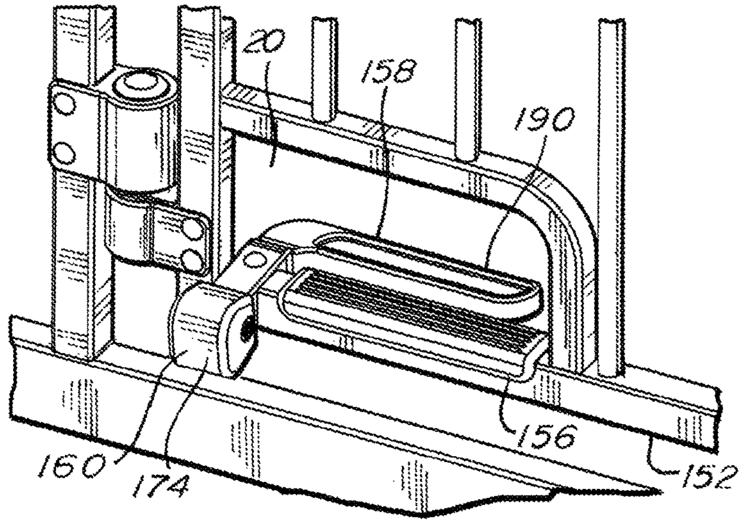
FIG. 6C is a front perspective detail view of the pivoting stop of the improved hands free gate of FIG. 4, showing the pivoting stop in a fully swung position, ready to permit a downward and vertical movement of the gate so as to permit the gate to be opened.

The out-of-the-way position for the pivoting stop 150 is any position where the pivoting stop 150 is out of a vertical plane defined by the gate 14, such as the out-of-the-way positions shown in FIGS. 6B and 6C. The position where the pivoting stop 150 is in the vertical plane defined by the gate 14 is shown in FIG. 6A.

The side faces 184 of the cap 174 extend in the width direction from side faces of inner portion 172. The width of cap 174 between the side faces 184 is greater than the distance between the inner end of horizontal support member 152 and the inner face of the lower end of vertical support member 50. Pivoting stop 150 is engaged to and swings between the inner end of horizontal support member 152 and the inner face of the lower end of vertical support member 50. Cap 174, and the lower stop portion 160, is prevented from swinging up beyond a horizontal plane or minimally beyond a horizontal plane, in which upper surface of tie bar 26 generally lies, by the sides of the cap 174 hitting the the vertically extending support member 50.

Figure 5A:
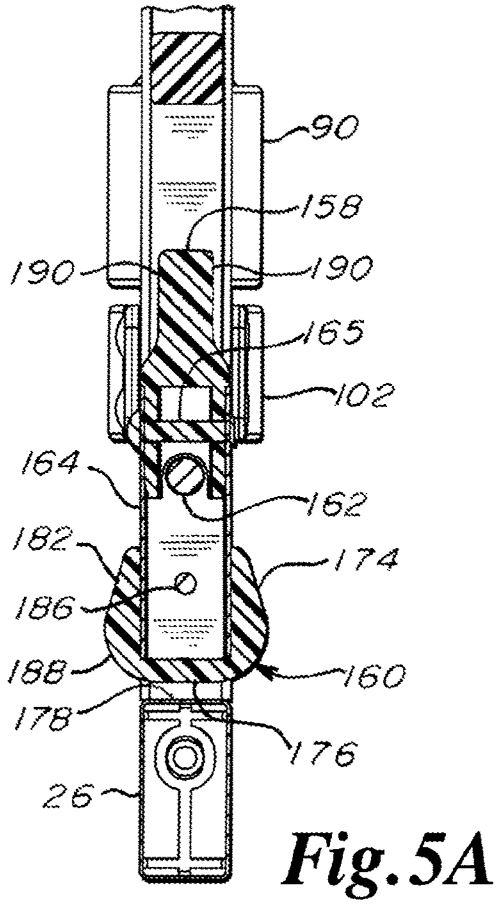
FIG. 5A is a vertical section view of the pivoting stop of the improved hands free gate taken at a right angle to a plane defined by the gate and barrier frame.
Figure 5B:
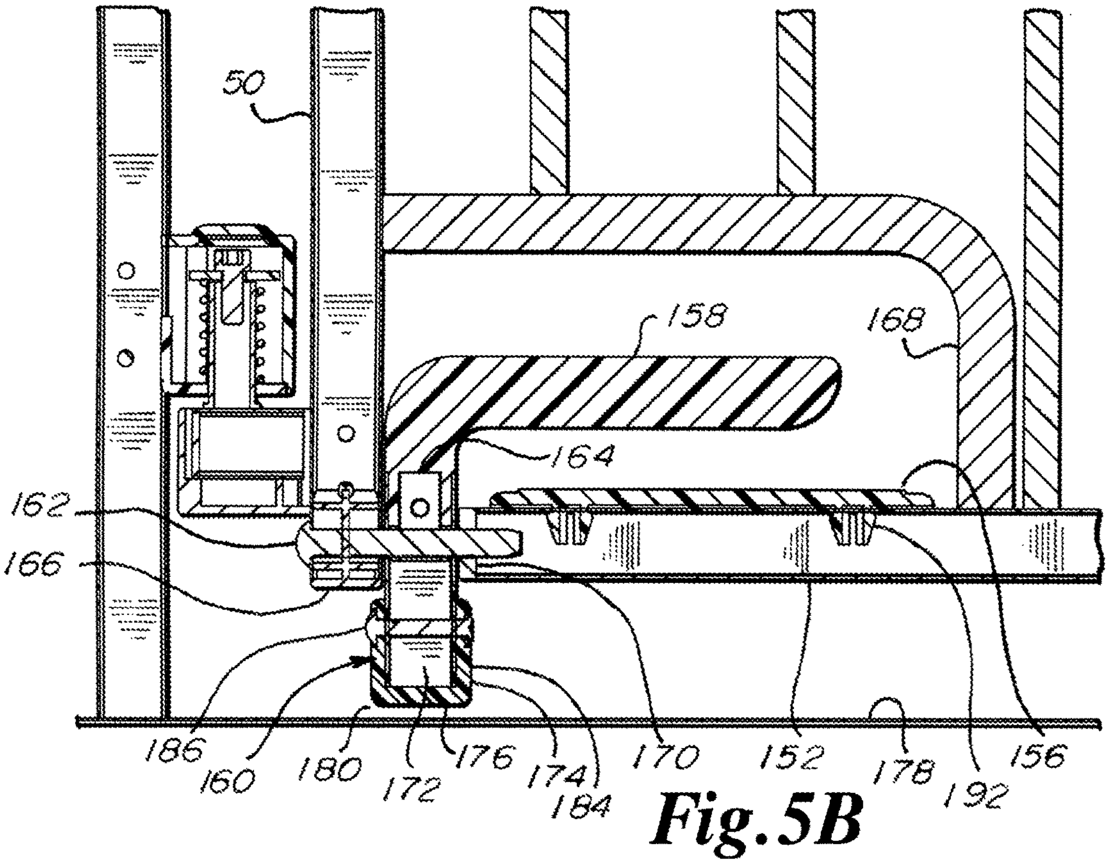
FIG. 5B is a vertical section view of the pivoting stop of the improved hands free gate taken in the plane, or parallel to the plane, defined by the gate and barrier frame.

As shown in FIG. 5B, it can be seen that the upper side of cap 174 is spaced from and adjacent to each of the inner end of horizontally extending support member 152 and the lower end of the vertical support member 50. The cap 174 thus swings upwardly, on either side of the gate 14, until a portion of the cap 174 hits one or more of the inner end of horizontally extending support member 152 and the lower end of the vertical support member 50.

Upper stop portion 158 includes a pair of opposing sides 190. In the position shown in FIG. 6A, each of the sides 190 defines a vertical plane that lies parallel to the plane defined by gate 14. This is the stop position or the position where the pivoting stop 150 stops downward and vertical movement of the gate 14 such as when someone leans upon the gate 14. A user may push his or her foot against one of the sides 190 to pivot the pivoting stop 150 to an out-of-the-way position, such as the positions shown in FIGS. 6B and 6C.

In the position shown in FIG. 6B, the planes defined by the sides 190 are oblique to the vertical plane defined by the gate 14. The axis of the medial portion 164 is oblique to the plane defined by the gate 14 and is parallel to the planes defined by the respective sides 190. In the position shown in FIG. 6B, the gate 14 may be moved downwardly and vertically by a foot pressing upon the foot grip 156 so as to open the gate 14 by the latch 40 exiting the bottomless latch receiver housing 18 through the bottom opening 120. In the position shown in FIG. 6B, the cap 174 may swing further upwardly or may swing further downwardly.

In the position shown in FIG. 6C, the planes defined by the sides 190 are at a right angle to the vertical plane defined by the gate 14. The axis of the medial portion 164 is at a right angle to the plane defined by the gate 14 and is parallel to the planes defined by the respective sides 190. In the position shown in FIG. 6C, the gate 14 may be moved downwardly and vertically by a foot pressing upon the foot grip 156 so as to open the gate 14 by the latch 40 exiting the bottomless latch receiver housing 18 through the bottom opening 120. In the position shown in FIG. 6C, the cap 174 has hit one or more of the inner end of horizontal support member 152 and the lower end of vertical support member 50 such that the cap 174 is at a peak pivot point and can pivot only downwardly.

Foot grip 156 is formed of a nonslip material. Foot grip 156 may be rubber or rubber like or be formed from an elastomer. Foot grip 156 may be formed of a resilient material. Foot grip 156 is U-shaped so as to cover the width of the upper side of horizontal support member 152 and portions of the side faces of the horizontal support member 152. Resilient or expanding prongs or claws 192 inserted through openings in the upper side of the horizontal support member 152 fix the foot grip 156 to the horizontal support member 152. The portion of the foot grip 156 covering the width of the upper side of horizontal support member 152 includes ridges extending parallel to the length of horizontal support member 152 so provide a nonslip surface for a foot as the foot presses down upon the foot grip 156 and horizontal support member 152. The foot grip 156 is a roughened foot grip 156 where the roughening is provided by the ridges.

The foot grip 156 and one of the opposing sides 190 of the upper stop portion 158 define a horizontal plane when the upper stop portion 158 is in the position shown in FIG. 6C. Each of the sides 190 of the upper stop portion 158 includes an elongate depression formed therein that may aid in catching the toe of a shoe. The elongate depression also serves to roughen the surface of side 190 so as to provide a nonslip side 190 and minimize a foot or a shoe from slipping off the upper stop portion 158.

In operation, as shown in FIGS. 6A, 6B and 6C, one foot pushing on the upper stop portion 158 pivots the lower stop portion 160 from an upright and stopping position (FIG. 6A), to a first out-of-the-way position (FIG. 6B), to a second out-of-the-way position (FIG. 6C). Then, or as soon as the lower stop portion 160 reaches any out-of-the-way position, even one slightly out of the plane of the gate 14 and prior to the position shown in FIG. 6B, the same foot pushing on the upper stop portion 158 presses down on the foot grip 156 and the horizontal support member 152 to draw the latch 40 out of the bottomless latch receiver 116 such that the gate 14 may be swung open.

After the gate 14 has been opened, the foot is typically removed from the foot opening 20 and from the upper stop portion 158 such that the vertical and downward pressure on the gate 14 is typically released such that the gate 14 rises upwardly by action of the coil springs 88. Then, when the gate 14 is swung shut so that the latch 40 swings back into the latch receiver housing 18, such as hitting the side of the latch receiver housing 18 and retracting automatically from such interaction, the lower stop portion 160 and cap 174 clears the upper side of the tie bar 26. If, for some reason, the gate 14 is held in a down position where the coil springs 88 are contracted and, at the same time, the gate 14 is swung into or through the plane of the barrier frame 12, the cap 174 harmlessly hits the side of the tie bar 26 and swings upwardly out of the way such that, if desired, the gate 14 can be swung through the barrier frame 12 in such down position.

It should be noted that an opening of gate 14 is a two step operation for a person. The first step is pivoting the pivoting stop 150 to an out-of-the-way position. The first step may be accomplished by a foot pushing against the horizontally running portion of the upper stop portion 158. The second step is a pushing down upon the gate 14 in a downwardly and vertical direction to slide the latch 40 out of the bottomless latch receiver housing 18. This second step may be accomplished by a foot pressing down upon the foot grip 156 and horizontal support member 152 or by a hand pressing down on some portion of the gate 14.

As shown in FIG. 4, barrier frame 12 includes a pair of frame extensions 194, 196. Frame extensions 194, 196 are disposed in the same plane as barrier frame 12 and as gate 14 when gate 14 is closed.

Frame extension 194 includes upper and lower horizontal support members and a set of two vertical support members engaged between the upper and lower horizontal support members. The lower horizontal support member has the same width and height dimensions as tie bar 26 and is coaxial therewith. The upper horizontal support member has the same width and height dimensions as upper horizontal support member 28 and is coaxial therewith. Hand screws are engaged to the outer ends of the upper and lower horizontal support members. Frame extension 194 engages to the tie bar 26 and upper horizontal support member 28 with male/female connections.

Frame extension 196 includes upper and lower horizontal support members and a set of three vertical support members engaged between the upper and lower horizontal support members. The lower horizontal support member has the same width and height dimensions as tie bar 26 and is coaxial therewith. The upper horizontal support member has the same width and height dimensions as upper horizontal support member 30 and is coaxial therewith. Hand screws are engaged to the outer ends of the upper and lower horizontal support members. Frame extension 196 engages to the tie bar 26 and upper horizontal support member 30 with male/female connections.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A gated barrier comprising:

a) a barrier frame, the barrier frame defining a barrier plane;

b) a gate engaged to the barrier frame, the gate defining a gate plane, the gate movable vertically in the barrier plane by pressure from a hand or foot of a user, the gate swingable relative to the barrier frame such that the gate swings out of the barrier plane; and c) a latch between the barrier frame and gate and engaged to one of the barrier frame and gate;

d) a latch receiver on one of the barrier frame and gate;

e) the latch having a latch end, the latch having an extended position relative to the latch receiver, the latch having a retracted position relative to the latch receiver;

f) the latch end being receivable in the latch receiver when the latch is in the extended position and when the latch end and latch receiver are both at a first height, the latch end being movable downwardly out of an open bottom of the latch receiver by said pressure when the latch is in the extended position so as to place the latch at a second height;

g) the gate being movable vertically in the barrier plane when the latch is in the extended position by said pressure;

h) the gate being swingable when i) the latch is in the extended position, ii) the gate is in the barrier plane, and iii) the latch is disposed at said second height;

i) the latch receiver further including a receiver top side, a receiver end opening, a receiver end side, a receiver first side, and a receiver second side, wherein the open bottom is directly opposite of the receiver top side, wherein the receiver end opening is directly opposite of the receiver end side, and wherein the receiver first side is directly opposite of the receiver second side, the receiver top side being closed;

j) the latch end having a latch end side, a latch end bottom side, a latch end top side, a latch end first side and a latch end second side;

k) when the latch is in the extended position, latch end side is adjacent to the receiver end side, the latch end bottom side is adjacent to the open bottom, the latch end top side is adjacent to the receiver top side, the latch end first side is adjacent to the receiver first side, and the latch end second side is adjacent to the receiver second side; and l) A hinge between the gate and the barrier frame, the hinge having a vertical axis such that the gate swings on the vertical axis, with said vertical axis being parallel to an elongate portion of the barrier frame, and with the hinge permitting downward movement of the gate relative to the barrier frame such that the latch is movable through the bottom opening of the latch receiver.

2. A gated barrier comprising:

a) a barrier frame, the barrier frame defining a barrier plane;

b) a gate engaged to the barrier frame, the gate defining a gate plane, the gate movable vertically in the barrier plane by pressure from a hand or foot of a user, the gate swingable relative to the barrier frame such that the gate swings out of the barrier plane; and c) a latch between the barrier frame and gate and engaged to one of the barrier frame and gate;

d) a latch receiver on one of the barrier frame and gate;

e) the latch receiver defined by a receiver first side, a receiver second side, a receiver end side, a receiver end opening, a receiver top side, and a bottom opening;

f) the receiver end opening receiving the latch, the receiver end opening being opposite of the receiver end side;

g) the receiver end side being closed;

h) the receiver first side being opposite of the receiver second side, the receiver first side having an angled face, the receiver first side being closed;

i) the receiver second side being opposite of the receiver first side, the receiver second side having an angled face, the receiver second side being closed;

j) the receiver top side being opposite of the bottom opening, the receiver top side being closed;

k) the bottom opening being opposite of the receiver top side;

l) The latch being movable through the bottom opening by said pressure when the latch and latch receiver are moved vertically relative to each other;

m) the latch having an extended position when the latch is moved through the bottom opening by said pressure and the gate being swingable after the latch has moved through the bottom opening by said pressure and while the latch is in said extended position;

n) the latch having a latch end, the latch end being receivable in the latch receiver, the latch end having a latch end side, a latch end bottom side, a latch end top side, a latch end first side and a latch end second side;

o) when the latch end is in the latch receiver, the latch end side is adjacent to the receiver end side, the latch end bottom side is adjacent to the bottom opening, the latch end top side is adjacent to the receiver top side, the latch end first side is adjacent to the receiver first side, and the latch end second side is adjacent to the receiver second side; and p) a hinge between the gate and the barrier frame, the hinge having a vertical axis such that the gate swings on the vertical axis, with said vertical axis being parallel to an elongate portion of the barrier frame, and with the hinge permitting downward movement of the gate relative to the barrier frame such that the latch is movable through the bottom opening of the latch receiver.

3. A gated barrier comprising:

a) a barrier frame, the barrier frame defining a barrier plane;

b) a gate engaged to the barrier frame, the gate defining a gate plane, the gate movable vertically in the barrier plane by pressure from a hand or foot of a user, the gate swingable relative to the barrier frame such that the gate swings out of the barrier plane; and c) a latch between the barrier frame and gate and engaged to the gate;

d) a latch receiver on the barrier frame;

e) the latch receiver defined by a first side, a second side, an end side, an end opening, a top side, and a bottom opening;

f) the end opening receiving the latch, the end opening being opposite of the end side;

g) the end side being opposite of the end opening, the end side being closed;

h) the first side being opposite of the second side, the first side being closed;

i) the second side being opposite of the first side, the second side being closed;

j) the top side being opposite of the bottom opening, the top side being closed;

k) the bottom opening being opposite of the top side;

l) The latch being movable through the bottom opening by said pressure when the latch and latch receiver are moved vertically relative to each other;

m) the latch having an extended position when the latch is moved through the bottom opening by said pressure and the gate being swingable after the latch has moved through the bottom opening by said pressure and while the latch is in said extended position;

n) the latch having a top side, with the top side of the latch being adjacent to the top side of the latch receiver when the latch is in said extended position; and o) a hinge between the gate and the barrier frame, the hinge having a vertical axis such that the gate swings on the vertical axis, with said vertical axis being parallel to an elongate portion of the barrier frame, and with the hinge permitting downward movement of the gate relative to the barrier frame such that the latch is movable through the bottom opening of the latch receiver.

* * * * *